United States Patent [19]
Cuthbert

[11] 3,929,648
[45] Dec. 30, 1975

[54] FILTER UNIT

[76] Inventor: Arthur Robert Cuthbert, 15 Fletcherdon Crescent, Downsview, Ontario, Canada

[22] Filed: May 7, 1974

[21] Appl. No.: 467,715

[30] Foreign Application Priority Data
Sept. 4, 1973  Canada .............................. 180219

[52] U.S. Cl. ................. 210/445; 210/446; 210/453
[51] Int. Cl.² ......................................... B01D 29/04
[58] Field of Search ............ 210/75, 445, 446, 450, 210/453, 473, 474, 486, 487; 55/501, 502, 510

[56] References Cited
UNITED STATES PATENTS

| | | | |
|---|---|---|---|
| 740,366 | 9/1903 | Knight | 210/474 X |
| 865,691 | 9/1907 | Fox | 210/450 X |
| 2,256,145 | 9/1941 | Hock | 210/450 X |
| 2,665,009 | 1/1954 | Harstick | 210/445 X |
| 2,862,623 | 12/1958 | Werner | 210/450 X |
| 3,004,671 | 10/1961 | Sugalski et al. | 210/445 |
| 3,085,689 | 4/1963 | Hering et al. | 210/445 X |
| 3,355,863 | 12/1967 | Pittsley | 210/445 X |
| 3,406,828 | 10/1968 | Boston | 210/445 X |
| 3,680,699 | 8/1972 | MacPherson | 210/75 |
| 3,782,083 | 1/1974 | Rosenberg | 210/445 X |

*Primary Examiner*—Charles N. Hart
*Assistant Examiner*—Robert H. Spitzer

[57] ABSTRACT

A filter unit is provided for filtering impurities out of liquids. The unit has a first housing member and a second housing member, at least one of which is made of stiff, but flexible and resilient, plastic material. The two housing members can be clamped together by fastening means extending centrally therethrough with a filter paper between. The first housing member is adapted to be inverted over the second housing member so that the respective peripheries of the housing members engage each other along a peripheral line of engagement while the respective central portions are apart. Sealing pressure along the line of engagement is provided by drawing said central portions relatively towards each other.

10 Claims, 4 Drawing Figures

FILTER UNIT

BACKGROUND OF THE INVENTION

1. Field of the Invention

This invention relates to a hydrostatic head filter unit for filtering impurities out of liquids.

2. Description of the Prior Art

Filter units for filtering liquids are known but many previous units are not portable, or they have many parts making them complex to operate, or they have elaborate fastening means making them difficult to assemble or disassemble when changing the filter paper, or they have elaborate sealing means to minimize leakage, or they are expensive to manufacture.

SUMMARY OF THE INVENTION

The filter unit of the present invention has a first housing member, a second housing member and a fastening means. The first housing member has a fluid inlet and the second housing member has a fluid outlet and an irregular surface for supporting a filter paper, the irregular surface providing drainage paths for liquid that has passed through said paper. At least one of the housing members is made of stiff, but flexible and resilient, material. The housing members have a peripheral line of engagement along which the filter paper can be clamped between the housing members. When the first housing member is inverted over the second housing member so that the respective peripheries of the housing members abut each other along said line of engagement while the respective central portions are apart, the fastening means can extend centrally through the housing members to clamp them together and draw the central portions relatively towards each other to provide increased sealing pressure along said peripheral line of engagement.

Preferably, both housing members are made of stiff, but flexible and resilient material and the first housing member is cup-shaped and relatively undeformable while the second housing is relatively deformable.

BRIEF DESCRIPTION OF THE DRAWINGS

A preferred embodiment of the invention will now be discussed with reference to the accompanying drawings in which.

DESCRIPTION OF THE PREFERRED EMBODIMENT

Figure 1:
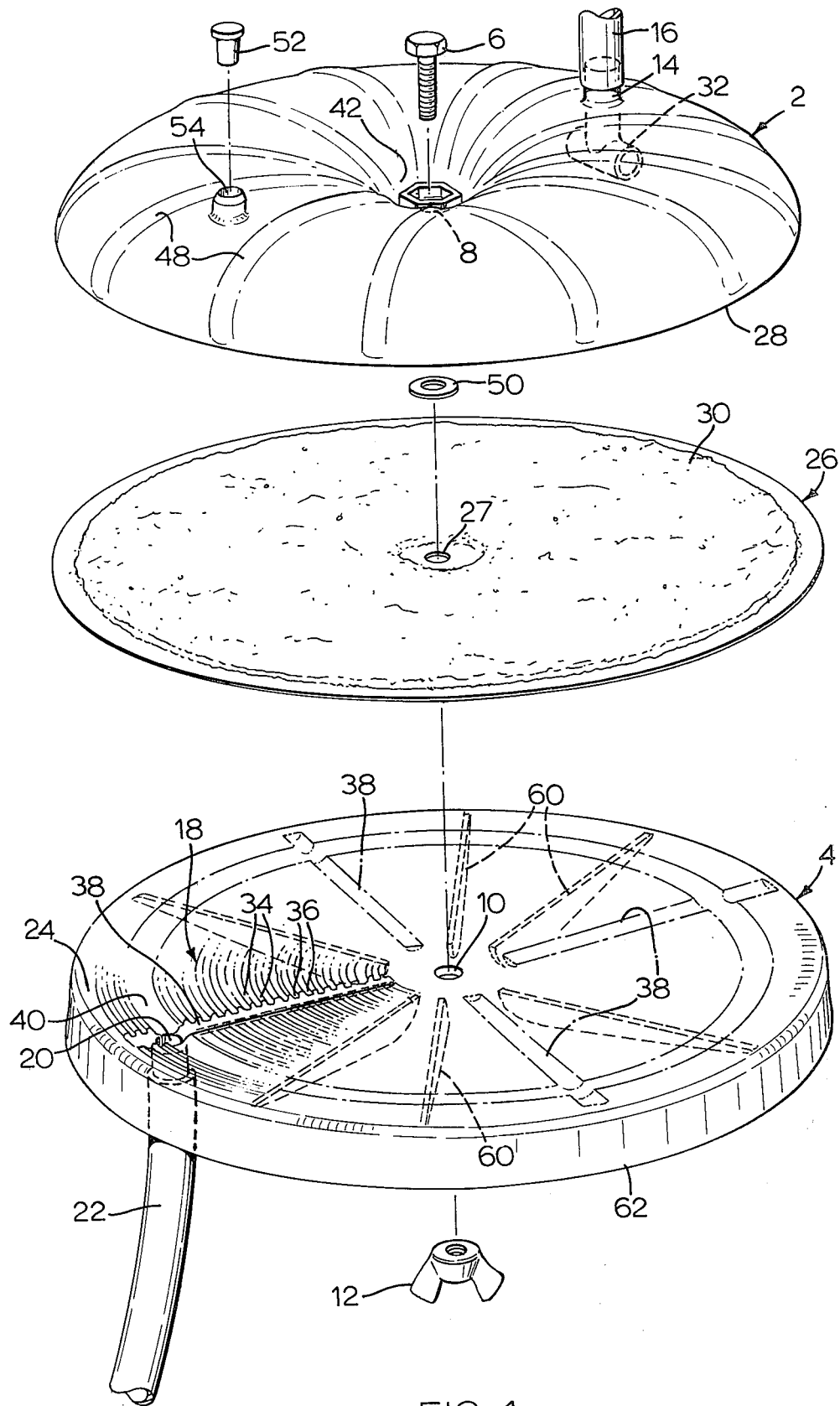
FIG. 1 is an exploded perspective view of a filter unit according to the present invention.

Referring to drawings in greater detail, in FIG. 1, a first or cup-shaped housing member 2 inverted over a second housing member 4. A bolt 6 of a fastening means is adapted to extend through central holes 8, 10 in the two housing members 2, 4 respectively to engage a wing nut 12 of the fastening means.

The cup-shaped housing member 2 has a fluid inlet 14, which is connected by an inlet tube 16 to a source of fluid to be filtered (not shown). The second housing member 4 has an irregular upper surface 18 and a fluid outlet 20 therefrom, connected by an outlet tube 22 to a filtrate reservoir (not shown). The fluid inlet 14 and the fluid outlet 20 are formed by integral tubular portions of the respective housing members 2, 4.

A smooth outer surface 24 extends peripherally around the irregular surface 18. The smooth outer surface 24 and the irregular surface 18 are adapted to support a filter paper 26, having a central hole 27, against a peripheral edge 28 of the cup-shaped housing member 2. The filter paper 26 in turn is adapted to support a layer of diatomaceous earth 30 within the first housing member 2. A deflector 32 is located below the fluid inlet 14 in order to prevent the force of the incoming fluid from washing away the layer of diatomaceous earth 30 beneath the inlet during the operation of the unit.

Figure 4:
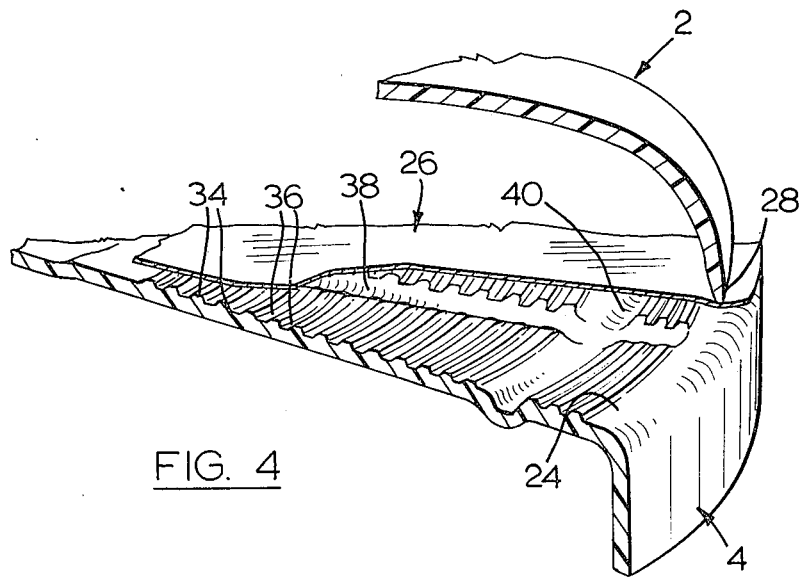
FIG. 4 is a partial perspective view of a segment of the filter unit when assembled.

The irregular surface 18 of the particular embodiment illustrated has a plurality of concentric ridges 34 and depressions 36 (see also FIG. 4). The depressions 36 provide drainage paths below the filter paper 26 to a series of radial grooves 38, while the ridges 34 provide support for the filter paper 26. The radial grooves 38 intersect an outer circular groove 40, the grooves 38, 40 constituting main passageways for carrying the filtrate to the fluid outlet 20.

Figure 3:
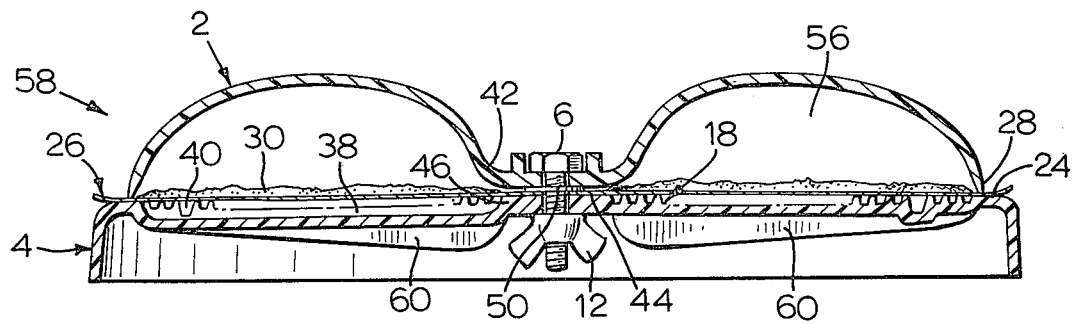
FIG. 3 is a sectional side view of the filter unit, when assembled with the fastening means fully tightended.

The cup-shaped housing member 2 is dimpled at its central portion 42 in order to rigidify the housing member 2 and also to provide an abutment 44 for a central portion 46 of the second housing member 4, as best seen in FIG. 3. Radial ribs 48 which are an integral part of the cup-shaped housing member 2 further increase the rigidity of the housing member 2. A washer or layer of resilient material 50 is located on the bolt 6 of the fastening means between the abutment 44 and the filter paper 26 to act as a cushion and to prevent leakage of fluid from the unit around the fastening means. The washer 50 can be made of neoprene rubber or other suitable material. The cup-shaped housing 2 has a purge valve, which in the embodiment illustrated is simply a plug 52 in a hole 54, to evacuate some or all of the air from the interior 56 of the cup-shaped housing 2 as it is being filled with fluid to be filtered.

Figure 2:
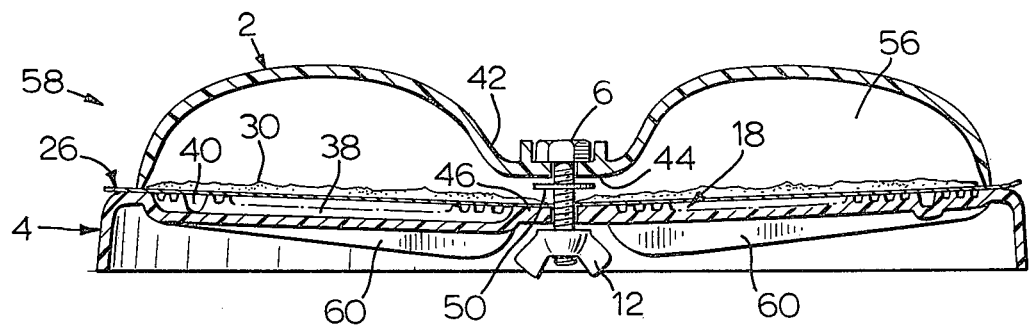
FIG. 2 is a sectional side view of the filter unit, when assembled with a fastening means loosely attached.

In FIG. 2, the various elements indicated in FIG. 1 are assembled to form a filter unit 58. The wing nut 12 of the fastening means is loosely attached so that the second housing member 4 is not under stress except that resulting from the weight of the filter unit 58. The upper irregular surface 18 is slightly concave when the second housing member is not under stress. When the first or cup-shaped housing member 2 is inverted over the second housing member 4, the peripheral edge 28 abuts the smooth outer surface 24, with the filter paper 26 in between, to provide a line of engagement (not shown), while the respective central portions 42, 46 of the housing member 2, 4 are apart. As the fastening means is tightened, the filter paper 26 will slide on the smooth outer surface 24.

In FIG. 3, the fastening means has been tightened to draw the central portion 46 of the second housing member 4 towards the central portion 42 of the first housing member 2 and hold it snugly against the abutment 44 of the first housing member 2, with the washer 50 and the filter paper 26 in between. In this position, which is the operating position, the housing members 2, 4 are clamped together and the irregular surface 18 is bowed convexly upwardly. The filter paper 26 is clamped against the smooth outer surface 24 of the second housing member 4 by the peripheral edge 28 of the cup-shaped housing member 2. The fact the irregular surface 18 is drawn towards the first housing member 2 and is therefore under stress causes the smooth outer surface 24 to exert increased sealing pressure against the peripheral edge 28, thereby minimizing leakage. This pressure is further increased by the fact that, when unstressed, the irregular surface 18 has a slightly concave shape: considerable force must thus be applied to the central portion of the second housing member 4 to alter the shape of the irregular surface from a concave to a convex shape. This sealing pressure is further increased by the provision of radial ribs 60 at the underside of the housing member 4. The radial ribs 60 increase the strength of the housing member 4, ensuring that considerable force is required to clamp the central portion 46 against the abutment 44. The resulting force of the smooth outer surface 24 against the peripheral edge 28 minimizes leakage. In addition, the convexly-bowed irregular surface 18 slopes downward towards the smooth outer surface 24, and this slope aids in carrying the filtrate towards the outer portion of the second housing member 4 where the circular groove 40 and the fluid outlet 20 are located. The housing member 4 has a peripheral skirt 62 on which the unit 58 can rest on a flat surface. The outlet 20 preferably is eccentrically located so that it can be placed beyond the edge of the flat surface.

The number and size of the radial ribs 60 that can be provided beneath the member 4 is limited by the requirement in the particular embodiment illustrated that the cup-shaped housing member 2 has greater rigidity than the second housing member 4, so that the cup-shaped housing member 2 will not bend to any great extent when the two housing members 2, 4 clamp together. As can best be seen in FIG. 4, the periphery of the cup-shaped housing member 2 tapers to a peripheral edge 28, the tapered peripheral edge increasing the pressure on the filter paper 26 to minimize leakage. Since the edge 28 is tapered, it will bite into the filter paper 26 as the wing nut 12 is tightened, thereby fixing the position of the filter paper 26 relative to the edge 28. If the cup-shaped housing member were to bend to any great extent as the wing nut 12 is tightened, the diameter of the peripheral edge 28 of the cup-shaped housing member 2 would increase slightly and it would tear the filter paper 26. The filter paper 26 is free to move relative to the smooth outer surface 24 and while extensive bending of the second housing member 4 as the wing nut 12 is tightened will cause the smooth outer surface 24 to move inward with respect to the peripheral edge 28 and the filter paper 26, such movement will not tear the filter paper.

Examples of stiff, but flexible and resilient, material that can be used in the present invention are styrene acrylonitrile, acrylonitrile butadiene styrene, acrylic and polycarbonate plastics. The preferred material, especially when the liquid being filtered is wine, is a styrene acrylonitrile, which is sold under the trade mark LUSTRAN SAN by Monsanto Canada Limited.

Other filter aids, for example, charcoal or cellulose can be used in place of diatomaceous earth. The cup-shaped housing member is preferably of transparent and colourless plastic material to enable the operator to see inside the unit during its operation.

One method of filtering a fluid using the filter unit of the present invention will now be discussed. Before the first housing member 2 is inverted to the position shown in the drawings, the diatomaceous earth 30 is poured into the first housing member 2, and the bolt 6 is inserted upwardly into the first housing member. The washer 50 is placed on the bolt 6 and the filter paper 26 is then placed over the bolt to rest on the peripheral edge 28 of the first housing member. Next, the second housing member 4 is placed, inverted, over the bolt with the smooth outer surface 24 resting on the filter paper 26. The wing nut 12 is then tightened onto the bolt 6, drawing the central portion 46 of the housing member 4 towards the abutment 44 of the first housing member 2 until the unit is clamped snugly together. With the unit remaining upside down, the fluid to be filtered is siphoned through the inlet tube 16 from a source of fluid located above the filter, and the inlet tube is connected to the fluid inlet 14. The cup-shaped housing member is flooded with the fluid to be filtered while the unit is gently agitated, the air displaced by the fluid being evacuated through the outlet 20. Then, the outlet tube 22 is connected to the fluid outlet 20 and the fluid flow is stopped by closing the outlet tube. The unit is then turned upright to the position shown in FIG. 3 and air remaining within the cup-shaped housing member is evacuated through the purge valve 52, 54. One end of the outlet tube 22 is then placed in a filtrate reservoir located below the filter, the outlet tube is opened and the filtrate begins to flow into the filtrate reservoir. At this stage, the unit can be raised to the same level as the bottom of the source of fluid. This is often convenient because the source of fluid and the filter unit 58 can be placed on the same table during the filtering operation with the outlet 20 located beyond the edge of the table and the outlet tube 22 extending into the filtrate reservoir below the table. The first portion of the filtrate may not have sufficient clarity as it will have passed through the unit before the diatomaceous earth has settled into place and therefore should be refiltered. While it is preferable not to interrupt the flow, this can be done at any time by simply closing off the inlet tube or the outlet tube.

The following examples illustrate the use of the filter unit of the present invention.

The first housing member of the filter unit used in the examples has a diameter of 8½ inches and the second housing member has a diameter of 9¼ inches. The filter area is 56.3 square inches and the inlet and outlet tubes each have an inside diameter of 5/16 inches.

The fluid "filtered" in the following three sample runs is tap water. Of course, tap water has very few, if any, insoluble impurities. However, the use of tap water gives a good indication of the approximate initial flow rates that can be achieved with the filter unit of the present invention. The flow rate will vary with the viscosity of the fluid being filtered and with the concentration of insoluble solids in the fluid. As the solids are deposited on the diatomaceous earth, the flow rate will decrease.

The initial liquid head (i.e. the vertical distance between the surface of the fluid in a source of fluid and the surface of filtrate in a filtrate reservoir located below the source) is 60 inches in all three sample runs. The liquid head decreases during filtration as the level of the source of fluid drops and the level of the filtrate in the reservoir increases. During filtration, the filter unit is placed on the same supporting surface as the source of fluid.

EXAMPLE NO. 1

| | |
|---|---|
| Filter Paper | No. 1123 (Rochester Paper Co. Ltd., U.S.A.) 0.026 in. thickness, 100% cellulose. |
| Flow Rate | 40 Imp. gal./hr. |
| Filter Aid | none used |

EXAMPLE NO. 2

| | |
|---|---|
| Filter Paper | same as that used in Example 1. |
| Filter Aid | Diatomaceous Earth - FW No. 60 (Eagle-Picher, Cincinnati, Ohio, U.S.A.) one cup, approximately ⅛ n. depth on filter paper surface. |
| Flow Rate | 36.1 Imp. gal./hr. |

EXAMPLE NO. 3

| | |
|---|---|
| Filter Paper | same as that used in Example 1. |
| Filter Aid | Diatomaceous Earth, FW No. 4 (Eagle-Picher, Cincinnati, Ohio, U.S.A.) one cup |
| Flow Rate | 13.3 Imp. gal./hr. |

A good indication of proper operation is obtained by observing the exposed edge of the filter paper 26. It is found that if this edge is wet, but not dripping, the pressure balance in the filter is correct. Greater or less wetness may be obtained by lowering or raising the filter, respectively.

Modifications to the preferred embodiment will occur to those skilled in the art and are intended to be covered by the following claims.

What I claim as my invention is:

1. A filter unit comprising:
   a first housing member having a fluid inlet;
   a second housing member having a fluid outlet, an irregular central surface portion and a smooth generally planar peripheral surface portion;
   a generally flat filter paper overlying said irregular and peripheral surface portions with said irregular surface portion providing drainage paths to said fluid outlet;
   said first housing member being configured and positioned to define a filter chamber between itself and said filter paper and having a peripheral edge opposite said smooth peripheral surface of said second housing member with said filter paper therebetween; and
   fastening means extending centrally through said housing members and serving to clamp them together and to clamp the periphery of said filter paper therebetween, said fastening means holding the central portion of said second housing member resiliently flexed toward the first housing member whereby to maintain sealing pressure between said members and the peripheral portion of said filter paper.

2. A filter unit as claimed in claim 1 wherein said fastening means holds the central portions of both said housing members in engagement with said filter paper.

3. A filter unit as claimed in claim 2 including a washer on the fastening means between the two housing members to prevent leakage around the fastening means, and an outlet to evacuate air from the first housing member as it is filled with fluid.

4. A filter unit as claimed in claim 1 wherein the drainage paths of the second housing member define a slightly concave surface when the second housing member is not under stress and is bowed convexly upwardly when the fastening means are tightened.

5. A filter unit as claimed in claim 1 wherein there is a series of grooves in the inner drainage surface of the second housing member to carry filtrate to the fluid outlet.

6. A filter unit as claimed in claim 1 including a layer of diatomaceous earth within the first housing member and a deflector under the fluid inlet of the first housing member to prevent the diatomaceous earth from being washed away by incoming fluid.

7. A filter unit as claimed in claim 1 wherin the housing members are made of stiff, but flexible and resilient, material, the first housing member being cupshaped and relatively undeformable while the second housing member is relatively deformable.

8. A filter unit as claimed in claim 7 wherein the second housing member has a peripheral skirt which forms a stand for the filter.

9. A filter unit as claimed in claim 7 wherein the central portion of the first housing member is dimpled, rigidifying said housing member and providing an abutment for the central portion of the second housing member.

10. A filter unit as claimed in claim 7 wherein the peripheral edge of the first housing member tapers to said peripheral edge so that the edge can bite into the filter paper.

* * * * *